J. C. JAY.
Band Tightener for Grain Shocks.
No. 87,678. Patented March 9, 1869.
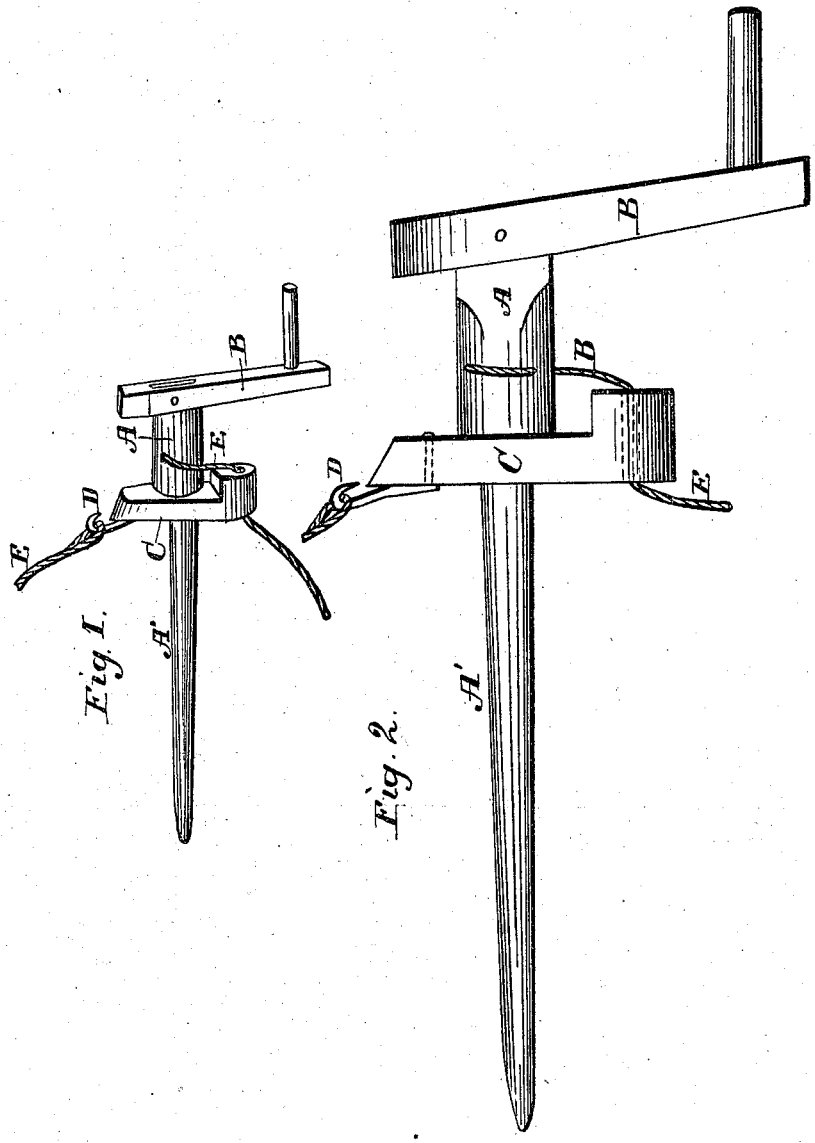

UNITED STATES PATENT OFFICE.

JAMES C. JAY, OF BEAR CREEK TOWNSHIP, JAY COUNTY, INDIANA.

IMPROVEMENT IN BAND-TIGHTENERS FOR SHOCKS OF CORN.

Specification forming part of Letters Patent No. 87,678, dated March 9, 1869.

*To all whom it may concern:*

Be it known that I, JAMES C. JAY, of Bear Creek township, in the county of Jay and State of Indiana, have invented a new and useful Improvement in Band-Tighteners for Shocks of Corn and other Grain; and I do hereby declare that the following is a full, clear, and exact description of the same, reference being had to the annexed drawings, making part of this specification, in which—

Figure 1 is a side elevation of the device, and Fig. 2 is a similar view on a larger scale.

Corresponding letters refer to corresponding parts in both figures.

The object of this invention is an improvement in that class of devices which are used for tightening bands of cord or wire around shocks of corn or other kinds of grain, or around bales, cocks, or stacks of hay, and other similar purposes.

A is a shaft of wood or metal, of, say, from eight to twelve inches in length, and having a considerable portion of its length made cylindrical or round, which rounded portion is pointed at its end to facilitate its entrance into the material in which it is to be used. To the extreme opposite end of said shaft, which, for a short distance, may be either square or round, or of any desired form, but which is of considerably larger diameter than the longer portion. A crank, B, is attached, for turning the same when the pointed end shall have been inserted into the grain. At a distance of about two or three inches from the crank end of said shaft, and against the shoulder formed by the enlargement thereof, a cross-arm, C, is placed, which is held in position by having a pin passed through it, a portion of the diameter of which projects into a groove formed in said shaft.

B is a crank attached to the outer or larger end of shaft A, for rotating the same, and it is of sufficient length to enable the operator to draw the band as tight as circumstances may require.

C is an arm or disk placed upon shaft A, as above described, with each of its parts extending about equal distances therefrom, and having upon one of its ends a hook for receiving a loop to be formed in one end of the band to be used. Upon the opposite end of this arm a boss is formed, for the purpose of giving the arm greater thickness at that point, and through this thickened end a hole is bored for the reception of the band. This arm or disk is arranged upon the shaft A so as to revolve freely thereon, but is prevented from having any longitudinal motion thereon by means of the shoulder and groove above referred to.

D is a hook, which is secured to one end of the arm C in any suitable manner, and is designed to hold firmly one end of the band while the other is being wound around the shaft.

E is the band, which may be of strong twine, cord, or wire, one end thereof being fastened to the larger portion of shaft A, after which it is passed through the hole in the end of arm C, and its opposite end, in which a loop has previously been formed, may be secured to the hook D.

It will be understood that the band E above described forms no part of my invention, and that the description thereof is for the purpose of giving information as to its use.

The operation of this device is as follows: The pointed end A' of shaft is inserted into whatever it is intended to bind or encircle with the band, one end of which is made fast to the larger portion of the shaft, when said band is passed around the shock of grain, and the loop on its other end is passed over the hook on the end of the arm C, when, by turning the crank B, said end of the band, which is attached to the shaft, will be wound around the same, and the band will thus be drawn around the material to be bound to any required degree of tightness, when it is secured by tying, or in any other convenient manner.

Having thus described my invention, what I claim, and desire to secure by Letters Patent, is—

The combination and arrangement of the arm C, the shaft A, hook D, and cord or wire E, substantially as shown and described.

In testimony whereof I have signed my name to this specification in the presence of two subscribing witnesses.

JAMES C. JAY.

Witnesses:
JAMES N. TEMPLER,
JOHN J. ADAIR.